United States Patent [19]
Brett

[11] Patent Number: 6,016,167
[45] Date of Patent: Jan. 18, 2000

[54] METHOD OF COLOR CORRECTING DIGITAL VIDEO DATA

[75] Inventor: Stephen Brett, Sutton-at-Home, United Kingdom

[73] Assignee: Pandora International, Ltd., Kent, United Kingdom

[21] Appl. No.: 08/833,215

[22] Filed: Apr. 14, 1997

[30] Foreign Application Priority Data

Apr. 12, 1996 [GB] United Kingdom ............... 9607651

[51] Int. Cl.⁷ .................. H04N 9/64; H04N 9/68
[52] U.S. Cl. ............. 348/646; 348/651; 348/708
[58] Field of Search .................. 348/708, 571, 348/645, 646, 649, 650, 651; H04N 9/64, 9/68

[56] References Cited

U.S. PATENT DOCUMENTS 5,450,500  9/1995  Brett .

FOREIGN PATENT DOCUMENTS

| 0 090 596 | 10/1983 | European Pat. Off. . |
| 2121645 | 12/1983 | United Kingdom . |
| 2274039 | 7/1994 | United Kingdom . |
| 2278514 | 11/1994 | United Kingdom . |
| 95/12289 | 5/1995 | WIPO . |
| 95/32582 | 11/1995 | WIPO . |

*Primary Examiner*—Sherrie Hsia
*Attorney, Agent, or Firm*—McDonnell, Boehnen, Hulbert & Berghoff

[57] ABSTRACT

A method of color correcting digital video data 21 is disclosed, comprising the steps of providing a workstation 22 connected to a source 20 of digital video data, analysing video data at the workstation 22 and making decisions relating to color corrections to be applied to the video data 21, generating color correction parameter data corresponding to the decisions, transmitting the video data and the corresponding color correction parameter data 23 to a remote color processor 28 for applying color corrections to the digital video data 26, applying color corrections to the digital video data in accordance with the correction parameter data, and returning the color corrected video data 27 from the color processor 28.

10 Claims, 3 Drawing Sheets

METHOD OF COLOR CORRECTING DIGITAL VIDEO DATA

REFERENCE TO RELATED APPLICATION

This application claims priority benefits under 35 U.S.C. § 119 based on United Kingdom Patent Application No. GB 9607651.8 filed on Apr. 12, 1996.

FIELD OF THE INVENTION

The present application relates to image processing and in particular to the post-production processing of video data, especially the colour-correction of such data.

SUMMARY OF THE BACKGROUND ART

In television post-production processing it is continually required to include film imagery into video media or broadcast TV media. To do this, it is usual for a facilities company to have suites, or rooms, of equipment dedicated to this purpose.

Such a telecine room will generally contain a dedicated telecine machine, such as an 'URSA' from Rank Cintel Ltd. in Ware, UK, or a 'FDL90' from Broadcast Television Systems in Germany, and a telecine controller and programmer, which may include such units as the 'POGLE' from Pandora International Ltd, or the 'RENAISSANCE' from Da Vinci Systems in Florida, USA.

Other units dedicated to the telecine room may include a noise reduction system, a vision mixer, and a colour correction system, such as the Pandora International Digital Colour Processor (DCP).

Such arrangements have been used for quite some time, and for pictures primarily in the Standard Definition range the arrangements are quite adequate. The term 'Standard Definition' refers to television pictures having of the order of 576 active lines, and of the order of 720 active picture elements per line. Newer forms of television broadcast include High Definition, utilising pictures having of the order of 1000 lines per picture, and of the order of 1900 picture elements per line. It can also be required to store pictures in a 'Digital Film' format, for the making of a second generation cinema film output. Typical resolutions for this involve in excess of 2000 lines per picture, and typically of the order of 3000 picture elements per line.

The trends towards High Definition and film resolution systems has involved a reassessment of the architectural layout of equipment in television post-production.

Because the frame rate of High Definition television is the same as that of Standard Definition, but each frame contains typically five times as much digital data, the consequent data rate is thus typically five times as high. This has led to the development of High Definition processing elements, which consist of several processing elements operating in parallel on different parts of the picture, to obtain the necessary throughput to process High Definition pictures in real time.

Pandora International has disclosed in WO 95/32582 that, because telecine machines are the most expensive single component in the arrangements described above, a change in architectural configuration can allow a telecine machine to be shared between several users.

Pandora International currently manufacture and sell the Digital Colour Processor (DCP) features of which are disclosed in GB 2 278 514.

Typically the processing power of an image processor such as a film resolution digital colour processor is due to two main features. The first of these is the extremely large input and output buffers (typically of the order of one half Gigabyte each). Secondly, there are the multiple colour processing engines (typically four engines).

SUMMARY OF THE INVENTION

According to a first aspect of the present invention, there is provided a method of colour correcting digital video data, comprising the steps of providing a workstation connected to a source of digital video data, analysing video data at the workstation and making decisions relating to colour corrections to be applied to the video data, generating colour correction parameter data corresponding to the decisions, transmitting the video data and the corresponding colour correction parameter data to a remote colour processor for applying colour corrections to the digital video data, applying colour corrections to the digital video data in accordance with the correction parameter data, and returning the colour corrected video data from the colour processor.

According to a second aspect of the present invention, there is provided a method for colour correcting digital video data wherein the digital video data and the required correction parameter data are downloaded to a colour processor from at least one peripheral correction source, the digital video data is corrected by the colour processor in accordance with the correction parameter data and the corrected digital video data is uploaded to the peripheral correction source.

Advantageously, there may be more than one correction source and the system may comprise routing means to direct the video information to be corrected and the correction information within the system and on its return to the appropriate correction source. The system may comprise a plurality of colour processors, which may be identical or different, and the routing means may direct the video information to one or more of these processors in accordance with the correction information.

Thus, for example, a Digital Colour Processor can be used as a centralised resource, to be shared between several users. Such a system may work in several ways.

The configuration of the colour processor described above can thus be used in a client-server architecture, to process video images, and in particular digital film images, at an extremely high data rate, or to process simultaneously four real-time images in Standard Definition, or two images of real time High Definition video for example. It will be appreciated that there exist a large number of variations in the application of such a client-server colour corrector depending on the number or capacity of processing engines and the number and requirements of the correction sources.

For example, one operating mode for such a system uses (in the four fold Standard Definition case) each of the four engines for a separate Standard Definition video information stream. An alternative operating mode uses all of the engines to process buffer accumulated real-time Standard Definition video information faster than real-time. Thus, by switching all of the four engines between the four streams, all four of the standard definition streams can be processed. Similar processes can, of course, be adopted for High Definition video or mixtures of Standard and High Definition video. Equally, the system may comprise any number of engines or any number of input video information streams.

In a single stream mode of operation, a controller may set up the system with the correct colour alteration parameters for a given scene or image. In a multiple image stream mode, it is preferable to utilise an information format whereby the image stream contains the alteration parameters of that particular stream, for example in the form of a header of data.

Thus according to a second aspect of the present invention, there is provided a method of transferring video information to a processor wherein the processor is supplied with discrete packets of video information, each packet additionally including information relating to the processing required for that packet.

Thus, video pictures may be processed as isolated packets of computer data. Conventionally, video signals are highly time dependant, and are all referenced relative to synchronisation pulses. Even in the case of digital video, timing is still used as the method of interpreting the data, because digital specifications contain interpretation directives such as '38 clock cycles after the syncbronising pulse . . . '.

One advantage of the above method over the prior art is that the colour processor is not required to either disassemble or reassemble complete pictures, as, for example, a packet protocol contains header information that allows all of this to take place invisibly to the digital colour processor. In other words, the colour processor simply processes a discrete chunk of video data, which is fully identified by the header information.

A further extension of the above architecture is to implement the communication between the, for example film resolution, colour processor and other peripherals necessary for post production via high speed communications protocols such as ATM (Asynchronous Transfer Mode). This may enable companies with such a device to offer bandwidth on their colour processor to other potential users that do not physically possess such a unit. In such a mode, picture data may be sent in packets. Dependant on the size of the packets, and the rate at which they arrive, more or fewer engines can be allocated to process the incoming video stream.

ATM, in common with other similar high speed data protocols, supports handshaking, by which a return pulse is sent from the destination to the source, to indicate that the destination is not ready for the next data or that data may be sent. This provides a control mechanism whereby a low speed colour processor can handle (at its own pace) high speed picture provision, without losing data. In an ideally matched configuration, the handshaking would not be required.

Because of the packet processing architecture, high bandwidth communications can be assimilated from a large number of low bandwidth lines. In order to reduce the required communication bandwidth, only those elements of the picture data which require correction may be sent to the processor and the packet header may be adapted to reflect the fact that the packet does not contain complete video information. Pixels to be processed may be selected in a manner analogous to that disclosed in GB-A-2 278 514.

Yet a further use of such a system is to process multiple colour manipulations. Each processor engine, as explained in GB-A-2 278 514, consists of for example six channels. Each colour channel can be altered individually. For example, if an operator wishes to alter the luminance of a certain range of reds, he can select that range and alter it. This will take one channel of the colour processor.

If the operator also wishes to alter the greenness of a grassy area in the picture, this will take a second channel. In some very complex cases it may be necessary to alter more than six distinct areas in a given scene. This can be accomplished by the use of a film resolution colour processor in which the first six channels can be processed by the first engine and the seventh to the twelfth channel can be processed in a second engine, and so on. Communication between engines can be achieved through the large buffers associated with a film resolution digital colour processor.

An exemplary engine may consist of two functional blocks. The first is a digital switch, consisting of a switchable data interface and backplane. The second is the actual colour engine. The colour engine itself may consist of several processing elements. These are typically (but are not restricted to) a primary channel (consisting, for example, of three one-dimensional look-up tables, being one for each of red, green, and blue), a six channel secondary, and a complex colour corrector. By dynamically configuring the multiple input and output ports to the engine, different functions can be performed. An example may be that the switching circuitry is used to route one image stream through the primary and secondary processing elements of a colour engine, whilst a different image stream, or series of packets, is put through the complex colour processor. Many such variations exist for the utilisation of the above hardware.

Yet another variation of the above is the use of virtual processors. It may be that for a given class of work, it is found that there are very few requirements for, for example, the complex colour corrector. This function may be provided purely by means of software, for example as programmed code for a general purpose microprocessor. This function will therefore be implemented many times slower than in a hardware colour processor. This may be tolerable, however, for occasional use, and at a later date the virtual processor, ie. the software emulation, may be replaced with a real, ie. hardware, processor if desired.

BRIEF DESCRIPTION OF THE DRAWINGS

A system in accordance with the present invention will now be described, by way of example only and with reference to the accompanying drawings, in which.

DESCRIPTION OF THE PREFERRED EMBODIMENT

Figure 1:
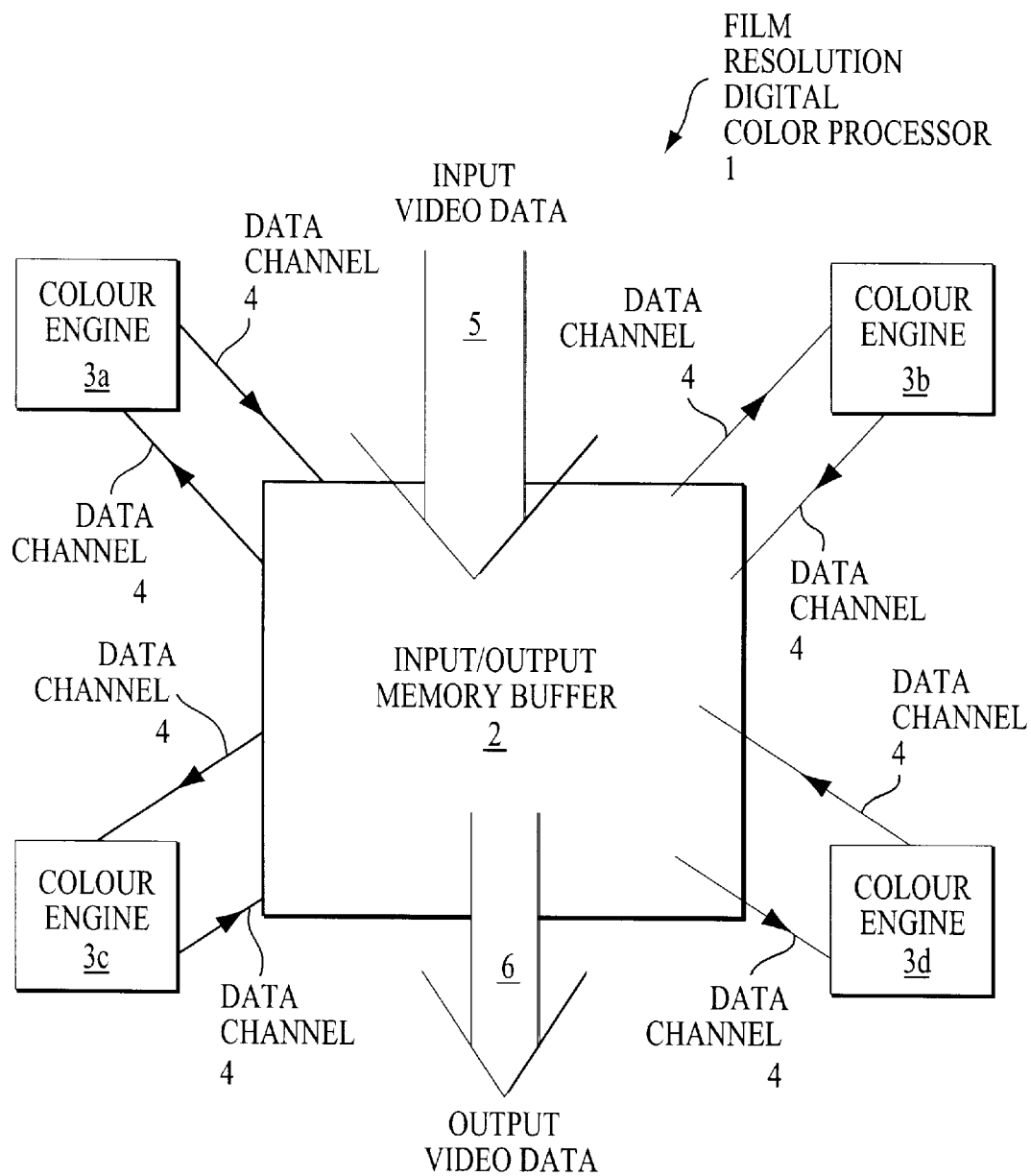
FIG. 1 is a schematic overview of a film resolution digital colour processor, showing the large buffer and multiple colour engines.

FIG. 1 shows a film resolution digital colour processor (DCP) 1. The DCP 1 comprises an input/output memory buffer 2 and four colour engines 3a–3d communicating with the memory buffer 2 via data channels 4. Input video data S is supplied to the buffer 2 from a correction source (not shown) and the buffer 2 distributes this data appropriately to one or more colour engines 3a–3d. The colour engine(s) 3a–3d correct(s) the video data in accordance with correction parameters supplied either with the input data or as settings of the processor 1. The corrected data is returned from the colour engines 3a–3d to the buffer 2 and is output from the buffer 2, and thus the processor 1, as output video data 6.

Figure 2:
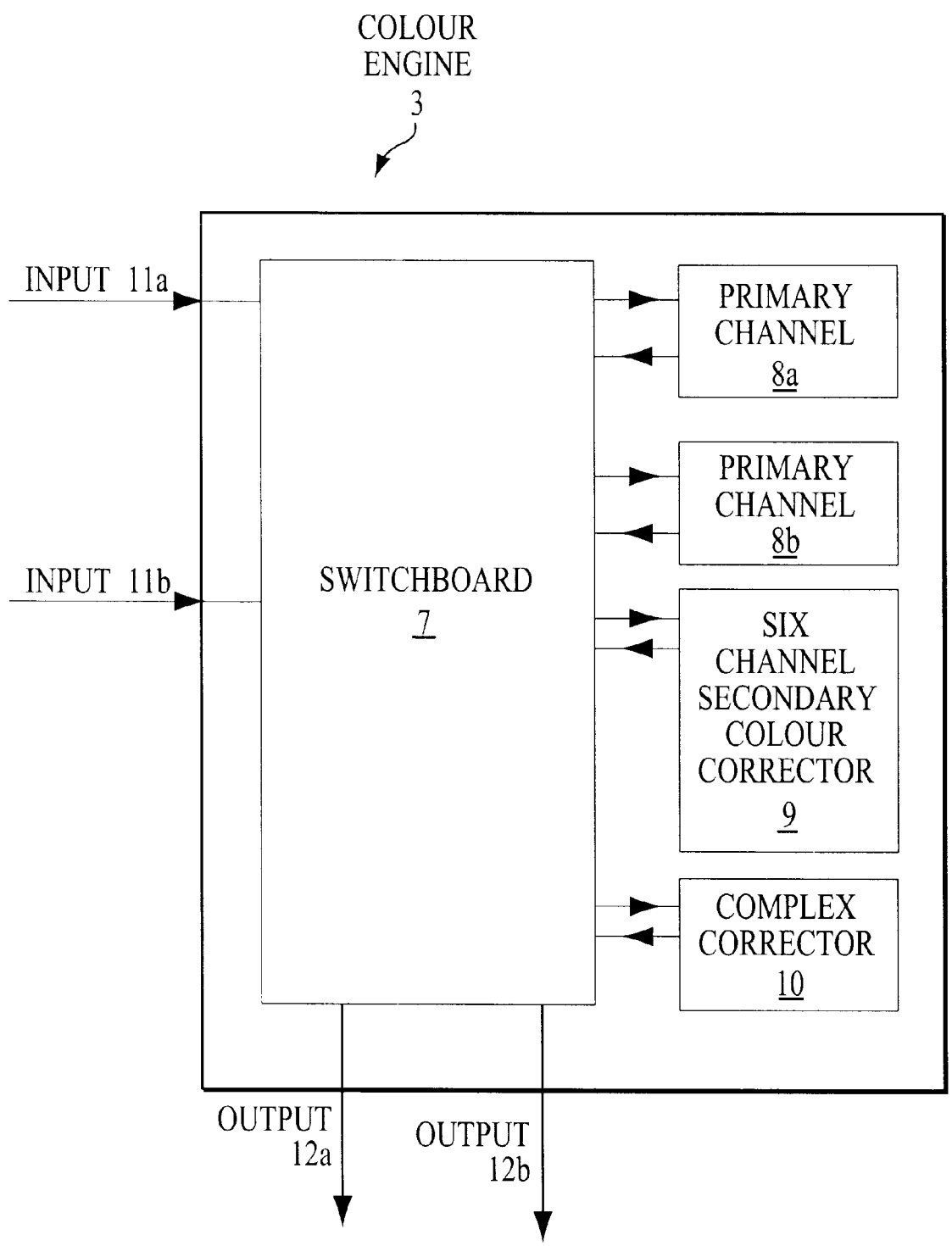
FIG. 2 is a schematic representation of a single colour engine of the processor of FIG. 1.

FIG. 2 shows a more detailed schematic view of one of the colour engines 3 of the processor 1 of FIG. 1. The colour engine 3 comprises a switchboard 7 connected to a first primary channel 8a consisting of three one-dimensional look-up tables, a second primary channel 8b, a six channel secondary colour corrector 9 and a complex corrector 10. The colour engine 3 has two inputs 11a,11b and two outputs 12a,12b.

Figure 3:
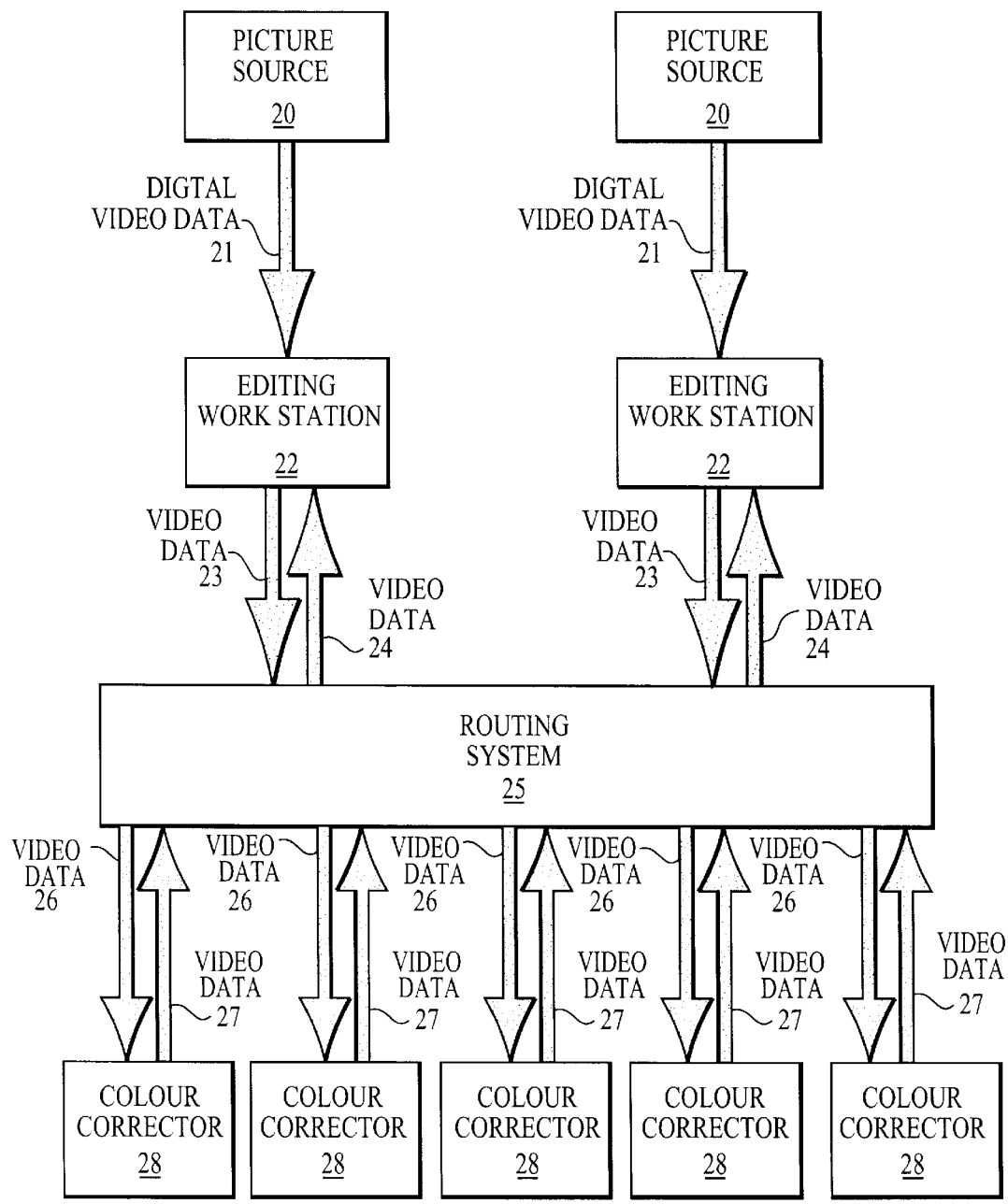
FIG. 3 is a schematic diagram of a system according to the present invention.

FIG. 3 represents a system for colour correcting digital video data according to the present invention. In this system, digital video data 21 is supplied from a picture source 20, such as a video tape machine, a telecine machine, an optical or magnetic storage device or an image generating computer, to an editing work station 22. The editing work station comprises a storage medium for the video data, such as an optical or magnetic disk, a monitor, such as a standard VDU, for viewing the content of the video data and an input means, such as a keyboard, mouse or control panel, for inputting decisions regarding the video data. A suitable workstation would be the Silicon Graphics 'Indy', available from Silicon graphics Inc.

At the editing work station 22, the operator views the video data on the monitor And makes decisions as to the degree of colour correction required to improve the picture quality to the desired level. The operator may decide that correction operations are necessary throughout the whole area of a single frame or a number of frames, or only a portion of the area of a single frame or a number of frames. The process of colour correction is well known and methods and apparatus for performing this process are described in, for example, U.S. Pat. No. 5,450,500 and International patent application WO 95/12289.

The operator inputs the correction decisions to the workstation 22 and these decisions are converted into correction parameters. The correction parameters, together with the video data 23 to be operated on, is sent to a routing system 25.

Preferably, only that part of the video frame that will be operated on using the correction parameters is sent to the routing system. This data may comprise only a portion of the total area of a frame or a series of frames or only a portion of the colour content of a frame or a series of frames. In this case, additional data such as timecode data and/or pixel and line information is included with the correction parameters so that the video data, once corrected, can be fitted back into the uncorrected data at the appropriate place.

The video data and correction parameter data 23 is sent to the routing system 25 in the form of a data packet. The data packet has a header identifying the source of the video data and correction data, together with the correction parameters. The header of the packet is followed by the video data 23 to be corrected with appropriate timecode and pixel/line information for each portion of video data. Suitable error correction information according to well known methods may also be included in the data packet. The data packet is self-contained such that it contains all the necessary information for the video data to be corrected and sent back to the originating workstation 22.

The connection from the work station 22 to the routing means 25 may be via an internal link to a separate part of the location at which the work station 22 is provided. However, the packet data transfer system allows the routing system 25 to be more remote from the workstation 22. Thus, the routing system may be located at any geographical location relative to the workstation 22, provided that a suitable connection, such as an ATM link, is available between the workstation 22 and the routing system 25.

The routing system 25 routes the colour correction parameters and the video data to the individual colour correctors 28. The colour correctors 28 shown in FIG. 3 may be individual colour correctors or may be channels of one or more colour correctors or may be the individual colour correction engines of one or more colour correctors, for example as described in U.S. Pat. No. 5,450,500. The routing system 25 directs the video data 26 to the most appropriate combination of colour correctors 28 in view of the level of definition of the video data and the degree of correction required. Thus, for example, where correction is required of only one colour component throughout a standard definition image, only one standard definition colour corrector 28 may be used. However, if several colour components of the standard definition image are to be corrected then a number of colour correctors 28 may be used corresponding to the number of colour components to be corrected. The video data is fed to these colour correctors simultaneously. In the case of high definition or film definition video data, the video data may be split between colour correctors 28 so that each corrector 28 operates on only a portion of the video data. In this way, the speed of processing is increased.

Once the video data 26 has been corrected by the colour correctors 28, the corrected video data 27 is sent back to the routing system 25. On the basis of the header data in the data packet in which the video data was supplied, the routing system 25 returns the video data 24 back to the work station 22 from which it originated as a return data packet.

As can be seen in FIG. 3, additional work stations 22 may be in communication with a single routing system 25, such that the colour correctors 28 may operate on video data from a number of work stations 22 under the control of the routing system.

It will be clear to the skilled man on reading the foregoing that there are many variants of and equivalents to the means and methods disclosed herein which, although not specifically described are nevertheless intended to be encompassed with in this disclosure, insofar as they may be equivalently used to put the invention into effect.

The disclosures of GB 2,278,514, U.S. Pat. No. 5,450,500 and International patent application WO 95/12289 are incorporated herein by reference.

What is claimed is:

1. A method of colour correcting digital video data, comprising the steps of providing a workstation connected to a source of digital video data, analyzing video data at the workstation and making decisions relating to colour corrections to be applied to the video data, generating colour correction parameter data corresponding to the decisions, transmitting the video data and the corresponding colour correction parameter data to a remote colour processor for applying colour corrections to the digital video data, applying colour corrections to the digital video data in accordance with the correction parameter data, and returning the colour corrected video data from the colour processor.

2. The method of claim 1 wherein discrete packets of video information are transmitted from workstation to the colour processor, each packet containing a portion of the digital video data and also colour correction parameter data relating to the said portion of the digital video data.

3. The method of claim 1, wherein a plurality of workstations are provided, each of which is capable of transmitting video data and the corresponding colour correction parameter data to the remote colour processor.

4. The method of claim 3 wherein the colour processor comprises multiple colour correction engines, an integer number (n1) of which are capable of being used together to process video data and colour correction parameter data corresponding to a relatively high data processing requirement, and an integer number (n2) of which are capable of being used to process video data and colour correction parameter data for video data corresponding to a lower data processing requirement, wherein n2 is in the range of 1 to a number less than n1, and wherein the colour processor processes simultaneously video data and the corresponding colour correction parameter data from the plurality of workstations for each of which the video data corresponds to lower than said relatively high data processing requirement.

5. The method of claim 4 wherein each of the multiple colour correction engines comprises a plurality of channels.

6. The method of claim 4, wherein the colour processor comprises four colour engines, all four of which are used for the colour correction of film resolution video data, pairs of which are capable of being used for the colour correction of high resolution video data, and individual ones of which are capable of being used for the colour correction of standard definition video data.

7. The method of claim 1, wherein the video data transmitted from the workstation to the colour processor contains only elements of the picture data which require correction.

8. The method of claim 7, wherein discrete packets of video information are transmitted from the workstation to the colour processor, each packet containing a portion of the digital video data and the colour correction parameter data relating to the said portion of the digital video data, and information identifying that the video data contains only elements of the picture data which require correction.

9. The method of claim 1, wherein the colour processor comprises multiple colour correction engines, each engine comprising a plurality of channels, and wherein for a given set of picture elements picture corrections are capable of being applied using the channels of more than one engine.

10. A method of colour correcting digital video data, comprising the steps of providing a plurality of workstations each connected to a respective source of digital video data, analysing video data at the workstations and making decisions relating to the colour corrections to be applied to the video data, generating colour correction parameter data corresponding to the decisions, transmitting the respective video data and the corresponding colour correction parameter data to a remote colour processor for applying colour corrections to the digital video data in accordance with the corrected video data from the colour processor, wherein the colour processor comprises multiple colour correction engines, an integer number (n1) of which are capable of being used together to process high resolution data from one of the workstations, and a smaller integer number (n2) of which are capable of being used independently to process lower resolution data simultaneously from a plurality of the workstations.

* * * * *